United States Patent [19]

Iiyama et al.

[11] 4,334,858
[45] Jun. 15, 1982

[54] PREVENTION OF THERMAL SPALLING IN CERAMIC PRODUCTS

[75] Inventors: Makoto Iiyama; Yasujiro Koyama, both of Yokohama, Japan

[73] Assignee: Nippon Kokan Kabushiki Kaisha, Tokyo, Japan

[21] Appl. No.: 171,988

[22] Filed: Jul. 24, 1980

[30] Foreign Application Priority Data

Aug. 6, 1979 [JP] Japan .................................. 54-99423

[51] Int. Cl.³ .......................... F27D 3/00; F27D 5/00
[52] U.S. Cl. ............................................ 432/9; 432/10
[58] Field of Search ............................. 432/1, 9, 10

[56] References Cited

U.S. PATENT DOCUMENTS

| 1,373,688 | 4/1921 | Vergnlaud | 432/9 |
| 2,050,225 | 8/1936 | Kohler | 432/10 |
| 2,311,309 | 2/1943 | Bergstrom | 432/9 |
| 3,618,920 | 3/1970 | Bohn | 432/10 |

FOREIGN PATENT DOCUMENTS 1365675  9/1974  United Kingdom .................. 432/1

Primary Examiner—John J. Camby
Attorney, Agent, or Firm—Frishauf, Holtz, Goodman & Woodward

[57] ABSTRACT

Ceramic product is heated or cooled at its side to impart temperature gradient for causing sinter so as to in advance provide residual stress in inside, thereby to prevent thermal spalling which is generated by difference in temperature during using the ceramic product.

10 Claims, 10 Drawing Figures

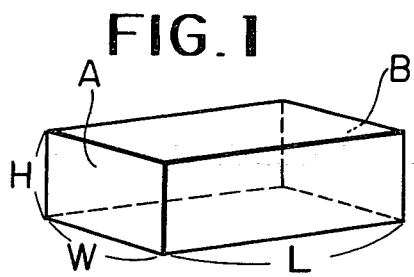
FIG._1
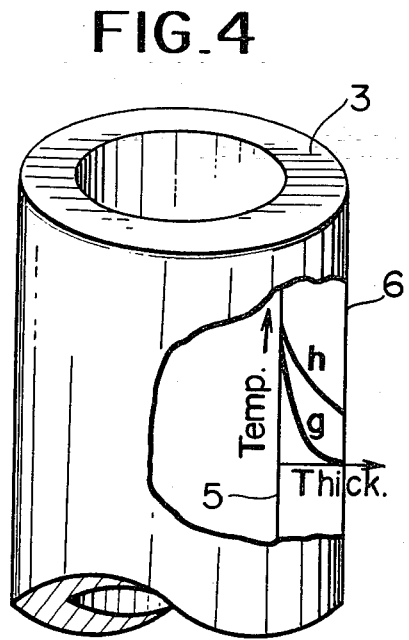
FIG._4
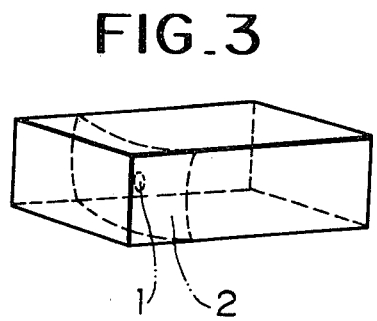
FIG._3
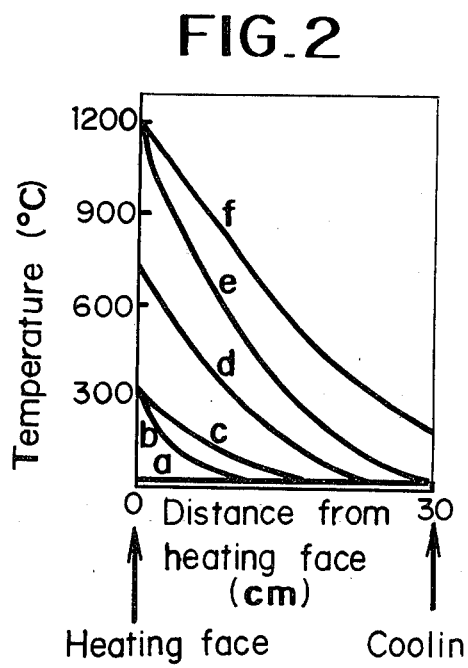
FIG._2
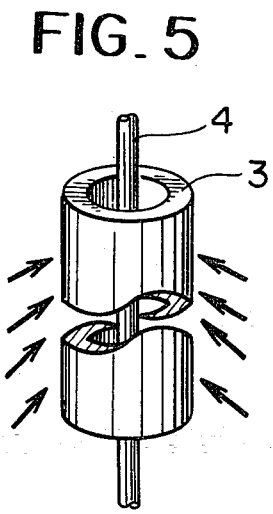
FIG._5

▼ Occurrence of crack

PREVENTION OF THERMAL SPALLING IN CERAMIC PRODUCTS

BACKGROUND OF THE INVENTION

The invention relates to a method of appropriately prevent thermal spalling caused in the refractory.

It is known that the refractory bricks or various kinds of ceramic products for the installation of the steel making furnaces create the thermal spalling by rapid difference in temperature.

With respect to the thermal spalling, when the refractory product is effected with the difference in temperature, free deformation at each of the parts composing the product is restrained owing to the differences of the materials of the parts or the difference in the amount of thermal expansion by the difference in temperature, and the thermal spalling is a phenomenon cracking the product when the thermal stress by the restrain of the deformation reaches enough to bring about destruction of the product.

For dealing with the thermal spalling, there have been proposed many countermeasures, for example, a method of decreasing the change of temperature given to the product, a method of employing such materials having high thermal shock resistance, or a method of heat treatment at the softening temperature of making the temperature of the product uniform, as seen in the reinforced glass, and forcedly cooling its surface for imparting the residual stress of compression to the surface. However, the first method has the problems of taking long period of the operating time and difficult in controlling the temperature. The second method is economically disadvantageous and may be involved with the problem of other physical characteristics, and this is not always useful. The third method has difficulties of providing the residual stress to the sintered substance unlike the glass, and in addition, the distribution of the residual stress is such that the surface is of compression and the inside is of corresponding tension, and if the product is a thin plate it is strong to the thermal spalling but if it has other shapes than the plate it does not work usefully.

The present invention has been realized in view these circumstances through experiments and investigations.

It is the first object of the invention to provide a method of remarkably improving the spalling resistance of the ceramic product to be used in the furnaces. It is the second object of the invention to provide a method of elongating the service life of the ceramic product by improving the spalling resistance with the aim of stabilization in long term of operation. It is the third object of the invention to provide a method of preventing the thermal spalling, which may be put into practice at low cost for many refractory bricks.

Other objects and features of the invention will be apparent from the following description of the invention in reference to the attached drawings.

BRIEF DESCRIPTION OF THE DRAWINGS

FIG. 1 is a perspective view of a fire clay brick used in the embodiment of the invention.

FIG. 2 is a view of the temperature distribution in the brick,

FIG. 3 is a perspective view showing occurrence of creacks in the brick,

FIGS. 4 and 5 are explanatory views that the instant invention is applied to a nozzle for the molten steel.

DETAILED DESCRIPTION OF PREFERRED EMBODIMENTS OF THE INVENTION

Figure 6:
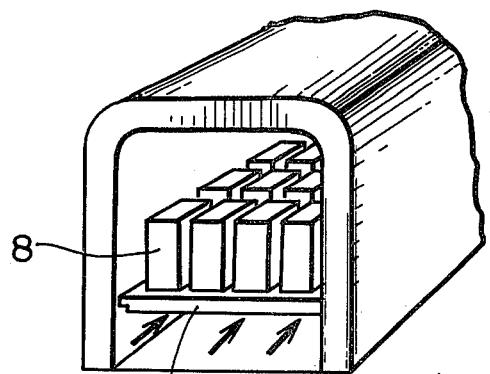
FIG. 6 is a perspective view of heat treatment of the invention at producing bricks.

Various investigations were carried out on the mechanism creating the thermal spalling in the refractory. FIG. 1 shows a shape of the fire clay brick used in the experiments (size: H=10 cm, W=18 cm, L=30 cm). This brick is used for lining of the metallurgical furnaces, and under the ordinary operating condition, the bricks are heated on the side A about at 2° C./min. It has been confirmed that if the side is heated more than 5° C./min, the thermal spalling takes place as the furnace conditions may be, and the operation of the furnace is obstructed thereby. In this regard, B designates a heat cooling side.

Such thermal spalling is generated in that the tension stress becomes large at a position 1 in FIG. 3 within the brick when the temperature distribution within the brick becomes as (b) in FIG. 2((b) denotes the temperature distribution generated by increasing the temperature at 5° C./min), and crack will be as shown at 2 in FIG. 3. On the other hand, when the rate of heating is small, the distribution becomes as (c) in FIG. 2. When the distribution (c) is compared with (b), the former is smaller in the gradient of temperature and in the thermal stress, and therefore, the thermal spalling does not occur.

Thus, it is noted that the occurrence of the thermal spalling is appropriately prevented by having in advance formed the compressive residual stress within the brick and countervailing the tensile stress generated during heating with this residual stress.

EXAMPLE 1

The fire clay brick, before using for the installation was heated at one side at such small rate that the thermal spalling does not occur, and the brick was held for 8 hours under the condition that the maximum temperature at the heating side was 1200° C. and the opposite side was 200° C. The temperature distribution of the brick changed as (a)-(c)-(d)-(e)-(f) in FIG. 2. The comparatively large thermal stress works in the brick just after the temperature reaches (f) of the constant temperature distribution, but the thermal stress is moderated as re-sintering advances.

In the invention, the higher is the temperature at the heating side A, the shorter is the holding time for the heat treatment, and vice versa. The rate of heating for this embodiment can be greater as the brick is smaller, but when the brick is larger, the heating rate should be smaller, otherwise the product is easily subject to the spalling during heating.

The brick was cooled at such rate that the spalling does not occur. In the invention, it is preferable to cool the brick at nearly the same rate as in heating. In the instant example, the brick was cooled at 2° C./min.

At the point when the brick is cooled to the room temperature, the deformation which is formed by re-sintering under the condition that the brick is given the temperature gradient, is stored as an initial strain, and therefore the residual stress is working in the brick. The distribution of the residual stress acts such that the stress at each part of the brick is weakened, when the same temperature gradient is given as carrying out the re-sintering. That is to say, the compressive residual stress acts at the part 1 in FIG. 3, and this residual stress is countervailed with the tensile stress which occurs during elevating the temperature. Therefore, even if the brick is heated after the heat treatment at 5° C./min at one side and given the distribution as shown in FIG. 2(b), the stress within the brick is smaller than that working in a non heat-treated brick, and the thermal spalling does not occur.

Figure 8:
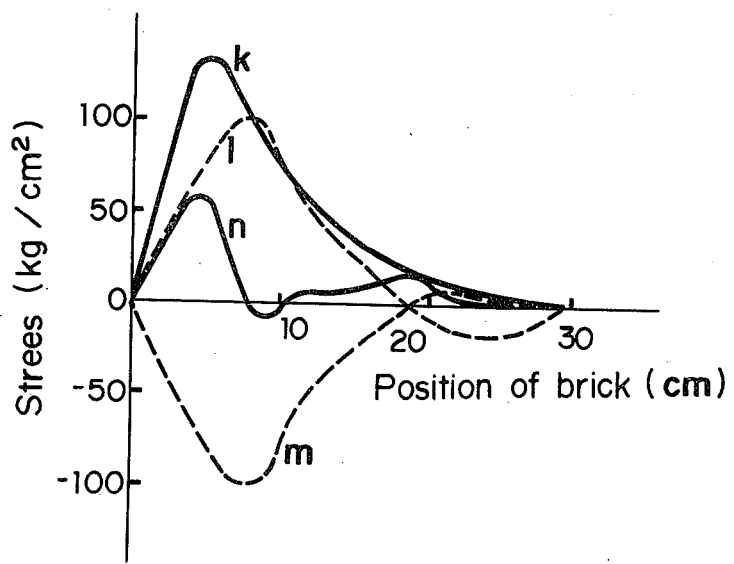
FIG. 8 is a view of the stress distribution in the brick in an embodiment according to the invention.

These relations will be investigated in detail in reference to FIG. 8. When crack occurs, the temperature distribution is like (b) in FIG. 2, and the stress along the center line of the brick is shown as (k). The maximum tensile stress is 130 Kg/cm$^2$. The fire clay brick in this experiment is assumed to have cracks at more than 120 Kg/cm$^2$, and the occurrence of the crack may be observed in heating at 5° C./min.

(1) shows a stress occuring when presuming that the resintering does not occur with the temperature gradient of the heat treatment of (f) in FIG. 2, however, the re-sintering actually occurs and this stress becomes nearer zero as the time advances during heating. (m) is a residual stress formed at the room temperature after the heat treatment.

(n) is a stress in the heat-treated brick which is generated during heating at the rate of 5° C./min, giving the temperature distribution of (b) in FIG. 2, and this stress is equal to the addition of (k) and (m). The maximum tensile stress is 57 Kg/cm$^2$ and no crack occurs because the value is far less than 120 Kg/cm$^2$.

When the furnace was provided with the lining making use of the heat treated bricks, no spalling occurred. Thus, it is confirmed that the above mentioned method is useful.

In a case of the larger brick, the heat treatment was carried out 0.5° C./min and the same effect was obtained.

EXAMPLE 2

In this example, the invention was applied to the nozzle for the molten metal as shown in FIG. 4. This nozzle is often cracked just after using. The reason is because the brick is rapidly heated by the molten steel flowing inside the nozzle. FIG. 4 (g) shows the temperature distribution of the nozzle when thermal spalling occurs.

For preventing the thermal spalling, the brick was treated as follows. That is, a heating element 4 was, as shown in FIG. 5, inserted into a hollow part of the nozzle 3, and the nozzle was heated at its inner side 5 and cooled at its outer side 6 at the same time, and the temperature was held, keeping the temperature distribution of (h) in FIG. 4. It is necessary that the nozzle is heated at such rate that the thermal spalling does not happen and kept at the high temperature enough for re-sintering. In this example, the brick was heated at 1° to 2° C./min up to 1200°0 C. and was held for 8 hours keeping the heating side at 1200°0 C. and the opposite side 200° C. It is also necessary that the cooling is at such rate that the thermal spalling does not take place. In this example, the cooling rate was 3° C./min.

In the nozzle cooled to the room temperature the residual stress works such that the stress generated at each part of the nozzle is made small when the temperature gradient becomes as (h) in FIG. 4. Therefore, when the temperature distribution of the nozzle becomes as (g) in FIG. 4, the heat-treated nozzle is smaller in the stress than in a non-treated one. No thermal spalling occurs.

EXAMPLE 3

Figure 7:
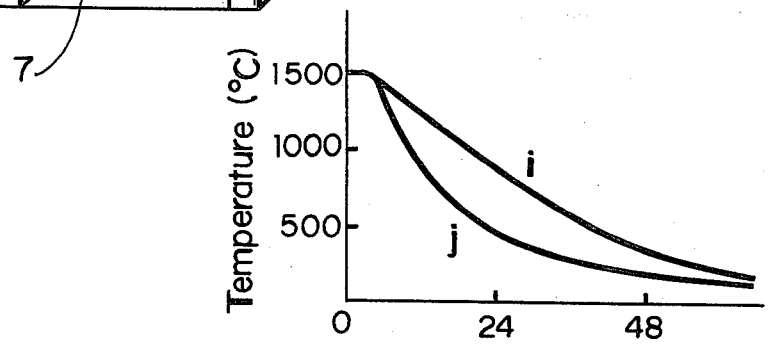
FIG. 7 is a view of the temperature distribution in the brick in a cooling process in FIG. 6.

In Examples 1 and 2, the finished product was subjected to the heat treatment. In the present example, a requested residual stress was provided in course of processing manufacture of a product. An object and using conditions in this example were the same as in Example 1. That is, in manufacturing the brick, the cold air was supplied under a furnace bed 7 as shown in FIG. 6 in a cooling stage after a firing process. The temperature of the furnace bed 7 was lower than the atmosphere in the kiln. The heat escaped from the lower side of the brick 8, and the temperature on the upper surface was higher than the lower surface. FIG. 7 (i) shows the temperatures on the upper surface, (j) the lower surface.

In this example, a burner may be employed to impart the temperature gradient to the brick.

Such product has the residual stress equivalent to that in the heat treated brick in Example 1, and accordingly, the equivalent spalling resistance may be obtained.

As is seen in this example, the heat treatment of the invention can be applied to many bricks, and therefore this example is more practical in comparison with Examples 1, 2 and 4 (later mentioned), and advantageous in cost, and in this example the brick was marked at its top and bottom.

EXAMPLE 4

In the present example, the heating treatment of the invention was carried out after installation of the bricks. The fire clay bricks were built within an experimental electric furnace followed by heating at 5° C./min to the temperature of 1300° C., holding for 20 hours and cooling at 5° C./min. While holding at 1300° C., the temperature gradient took place in the bricks as in Example 1 and the residual stress occurred therein. Thus, by this method the object of the invention can be attained.

Figure 9:
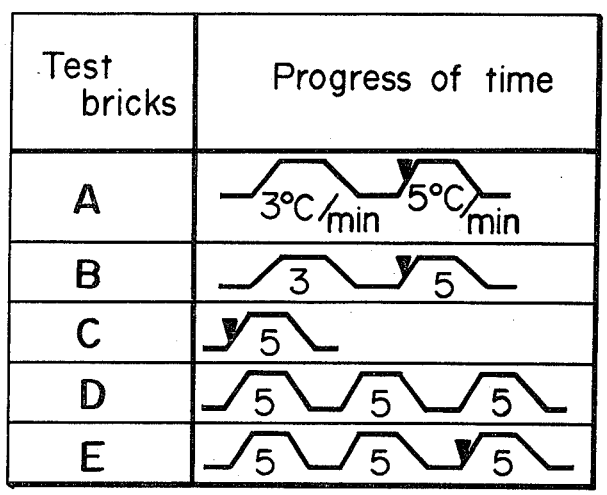
FIG. 9 is a graph of comparison in occurrence of cracks between the brick according to the invention and the comparing example.

FIG. 9 shows comparison between the brick heat treated by the invention (Example 1) and the non-treated ones with respect to the time when crack occurs. A to C are concerned with the non-treated bricks, D and E are the treated bricks. It is apparent from this comparison that the resistance to the thermal spalling is by far improved by this invention.

Figure 10:
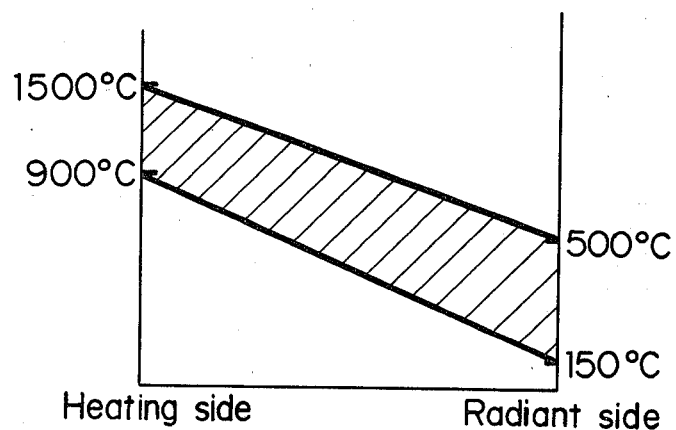
FIG. 10 is a graph showing a scope of temperatures where the invention may be advantageously employed.

In the instant heat treatment it is necessary to raise the temperature of the brick higher than the temperature where the re-sintering takes place and in the case of the fire clay brick, it is about 800° C. The preferable temperature range is shown in FIG. 10 for the fire brick.

The present invention is not limited to the fire clay bricks, and may be of course applied to the ceramic products having possibility of the thermal spalling. In such a case, the temperature gradient and others for providing the preferable residual stress depend upon the property of the substance to be used.

We claim:

1. A method for heat treating ceramic products to prevent spalling when they are subsequently heated consisting essientially of heating one side of said ceramic product to a temperature of least 800° C. at which the portion of said ceramic product adjacent said heated side will re-sinter while maintaining an opposed side of said ceramic product at a temperature of at least 400° C. lower than the temperature of said heated side to provide a temperature gradient between said sides and cooling said ceramic product to provide a residual stress in the interior of said ceramic product which acts to prevent thermal spalling on re-heating.

2. The method of claim 1 wherein a ceramic product which is being manufactured at an elevated temperature of at least 800° C. has one side thereof cooled to produce said temperature gradient.

3. The method of claim 1 wherein a ceramic product is being manufactured by firing and wherein one side is heated by a flame from a burner to produce said temperature gradient.

4. The method of claim 1 wherein an already manufactured ceramic product is heat treated by heating one side to a temperature of at least 800° C.

5. The method of claim 1 wherein said ceramic product is a cylindrical ceramic product and said temperature gradient is produced by heating the inside of said cylindrical product and cooling the outside of said cylindrical product.

6. The method of claim 1 wherein said ceramic product is a fire clay brick.

7. The method of claim 1 or 3 or 4 or 5 or 6 wherein said ceramic product is heated at a heating rate between 0.5° C. per minute and 5° C. per minute.

8. The method of claim 7 wherein after said ceramic product is heated to at least 800° C. to provide said temperature gradient and after said ceramic product has re-sintered to form said residual stress, said ceramic product is cooled at a rate nearly equal to said heating rate.

9. The method of any one claims 1, 2, 3, 4, 5 or 6 wherein said one side of said ceramic product is heated to a temperature of at least 900° C.

10. The method of claim 7 wherein said one side of said ceramic product is heated to a temperature of at least 900° C.

* * * * *